US010226716B2

(12) United States Patent
Fabbian

(10) Patent No.: US 10,226,716 B2
(45) Date of Patent: Mar. 12, 2019

(54) DEVICE FOR REDUCING THE ALCOHOL CONTENT OF WINES AND OTHER ALCOHOLIC BEVERAGES

(71) Applicant: PROGETTO 3000 S.R.L., Limena (PD) (IT)

(72) Inventor: Roberto Fabbian, Limena (IT)

(73) Assignee: PROGETTO 3000 S.R.L., Limena (PD) (IT)

( * ) Notice: Subject to any disclaimer, the term of this patent is extended or adjusted under 35 U.S.C. 154(b) by 251 days.

(21) Appl. No.: 15/115,475

(22) PCT Filed: Jan. 27, 2015

(86) PCT No.: PCT/IT2015/000013
§ 371 (c)(1),
(2) Date: Jul. 29, 2016

(87) PCT Pub. No.: WO2015/114673
PCT Pub. Date: Aug. 6, 2015

(65) Prior Publication Data
US 2017/0165589 A1 Jun. 15, 2017

(30) Foreign Application Priority Data

Jan. 30, 2014 (IT) .............................. VI2014A0025

(51) Int. Cl.
*B01D 3/02* (2006.01)
*B01D 3/14* (2006.01)
(Continued)

(52) U.S. Cl.
CPC ............. *B01D 3/003* (2013.01); *B01D 3/001* (2013.01); *B01D 3/02* (2013.01); *B01D 3/14* (2013.01);
(Continued)

(58) Field of Classification Search
CPC . B01D 3/003; B01D 3/14; B01D 3/02; B01D 3/4211; B01D 1/00; B01D 1/011;
(Continued)

(56) References Cited

U.S. PATENT DOCUMENTS 2,099,864 A * 11/1937 Miller .................... B01D 3/001
426/312
3,998,704 A * 12/1976 Follain ..................... B01D 3/42
202/160
(Continued)

FOREIGN PATENT DOCUMENTS

| DE | 3529956 A1 | 2/1987 |
| EP | 0406093 A1 | 1/1991 |
| FR | 578319 A | 9/1924 |

OTHER PUBLICATIONS

Letter from Italian Patent Office dated Oct. 14, 2014.
(Continued)

*Primary Examiner* — Joseph W Drodge
(74) *Attorney, Agent, or Firm* — Hedman & Costigan, P.C.; James V. Costigan; Kathleen A. Costigan

(57) ABSTRACT

A device for reducing the alcohol content of wines and other alcoholic beverages, comprising a distillation column (71) of the liquid to be treated, a first sensor (31) for measuring the temperature of the liquid, a heating resistance (41) for heating the liquid, a second sensor (55) for measuring the temperature of the vapors in the column (71) and an outlet pipe (60) of the vapors, which is connected to a condenser (18) and then reaches a collection container (24), inside of which the vacuum is provided by means of a setting solenoid valve (20) and a vacuum pump (21), which are connected to a pressure sensor (19); an electronic control circuit (16) detects the measurements made by the temperature sensors (Continued)

(31, 55) and by the pressure sensor (19) and adjusts the power of the heating resistance (41) and the opening of the setting solenoid valve (20).

10 Claims, 3 Drawing Sheets

(51) Int. Cl.
*B01D 3/42* (2006.01)
*C12G 1/00* (2006.01)
*C12G 3/08* (2006.01)
*B01D 3/00* (2006.01)

(52) U.S. Cl.
CPC .............. *B01D 3/42* (2013.01); *B01D 3/4211* (2013.01); *C12G 1/00* (2013.01); *C12G 3/08* (2013.01)

(58) Field of Classification Search
CPC ........ B01D 1/0082; B01D 1/30; B01D 3/001; B01D 3/08; B01D 3/42; B01D 36/00; B01D 36/04; B01D 37/00; C12G 3/08; C12G 1/00; C12H 1/00
USPC ........ 159/1.1, 47.1; 202/152, 158, 176, 177, 202/185.1, 200; 203/1, 2, 39, 99; 210/741, 742, 774; 426/493, 494, 592
See application file for complete search history.

(56) References Cited

U.S. PATENT DOCUMENTS

| | | | |
|---|---|---|---|
| 4,028,194 A | 6/1977 | Boyd | |
| 4,314,890 A * | 2/1982 | Beck | B01D 3/00 203/1 |
| 4,329,206 A | 5/1982 | Cartland | |
| 4,502,921 A | 3/1985 | Shinskey | |
| 4,570,534 A * | 2/1986 | Boucher | B01D 1/222 99/277 |
| 4,626,437 A * | 12/1986 | Schobinger | C12G 3/08 426/14 |
| 5,034,238 A * | 7/1991 | Seidlitz | C12G 3/08 426/330.4 |
| 2003/0024801 A1* | 2/2003 | Young | B01D 3/166 202/154 |
| 2004/0185151 A1* | 9/2004 | Pisoni | G01N 33/146 426/231 |
| 2015/0132459 A1* | 5/2015 | Pienaar | C12G 3/08 426/493 |

OTHER PUBLICATIONS

Italian Patent Office Search Report and Written Opinion dated Oct. 7, 2014 (partially in English).
Notification of Transmittal of the International Search Report and the Written Opinion of the International Searching Authority for PCT/IT2015/000013 dated Jun. 1, 2015.

* cited by examiner

DEVICE FOR REDUCING THE ALCOHOL CONTENT OF WINES AND OTHER ALCOHOLIC BEVERAGES

The present invention generally relates to a device configured to reduce the alcohol content (a partial de-alcoholizing) of wines and other alcoholic beverages, which is called ETA50.

More particularly, the invention relates to a functional evolution of the known technique of de-alcoholization of wine which is carried out by means of distillation and the device of the invention can be used for domestic use and for restoration by treating small quantities of wine and/or other alcoholic beverages (for catering and/or at bars, restaurants, taverns or other business establishments where the wine and/or other alcoholic beverages are distributed by the glass or by draught).

The latest international standards relating to oenological practices also refer to the categories of "drinks obtained by the de-alcoholization of wine" and "beverages obtained from a partial de-alcoholization of wine" and specify the technical separations that can be used for reducing the alcohol content of wines, also making a distinction between the correction of the alcohol content and the de-alcoholization of wine.

According to the legal regulations, a correction of the alcohol content of a wine, which means reducing an excess of the ethanol level to improve the organoleptic balance, is allowed up to a maximum reduction of 20% and the products thus obtained, however, have to meet the definition of wine and, above all, have to maintain a minimum alcohol content (if said products are named as "wines").

Otherwise, if the alcohol content of the wine is reduced by over 20%, a de-alcoholization process was carried out, which means that a part or almost all of the ethanol contained in the wine has been removed, in order to obtain products with reduced or low alcohol content.

The separation techniques through which it is possible to achieve the objectives mentioned above include a process of partial vacuum evaporation, a distillation process or other membrane techniques.

The de-alcoholization of wine carried out by means of a distillation process is generally applied using industrial installations for the treatment of large quantities of product, as the complexity of the process and the equipment control require bulky and very expensive industrial systems.

As shown in detail in the enclosed FIG. 1, the industrial process for the de-alcoholization of wine which is made by means of a fractional distillation phase involves the use of a distillation column which is substantially constituted by a shell or column 1, in which the wine is inserted, a storage tank 2, which provides heat to the wine, and a condenser 3, which cools and condenses the overhead vapors.

The temperature inside the distillation column 1 rises up, thanks to the storage tank 2, to reach the evaporation point of the ethyl alcohol and therefore both the ethyl alcohol and other volatile substances of the solution 4 of wine to be treated pass from a liquid state to a gaseous state, through the column 1 from a lower portion to an upper portion, because said substances are more light.

During the path, said volatile substances meet the instillation dishes 5, which constitute a series of stages in which a vapor-liquid equilibrium phase is established between the upward gas stream and the downward liquid stream, so as to separate the gaseous part, which flows towards the top of the column 1, from the liquid part, which flows from the top to the bottom of the column 1.

Therefore, the lighter substances accumulate on the head of the column 1 and reach the condenser 3, within which they are able to condense and to return to the liquid state, so as to be collected in the container 8; the condenser 3 is also cooled by the coolant 7, which is put into circulation by the pump 6.

During the distillation process, the pressure inside the column 1 is lowered with respect to the atmospheric pressure, in order not to significantly vary the organoleptic properties of the wine; therefore, it is possible to lower the temperature value necessary to reach the point of evaporation of the ethyl alcohol.

The object of the present invention is to provide a device for reducing the alcohol content of wines and other alcoholic beverages, without using complex, bulky and expensive systems, as used, on the contrary, for carrying out a de-alcoholization of wine by means of a distillation process, as mentioned above.

Another object of the invention is to provide a device for reducing the alcohol content of wines and other alcoholic beverages, so as to obtain wine in small quantities and to quickly and easily provide even small doses of wine ready for use.

Another object of the invention is to provide a device for reducing the alcohol content of wines and other alcoholic beverages, thus helping to avoid the overcoming of dangerous alcohol levels of users, without significantly varying or altering the aromatic qualities and the organoleptic characteristics of the beverage.

A further object of the present invention is to provide a device for reducing the alcohol content of wines and other alcoholic beverages, which does not require installation and which has a limited size, so it can be used at home, in bars, restaurants, taverns, etc., and that it is also portable, fully automatic and fast, with easy and cheap maintenance, as well as extremely simple to use.

These and other objects are achieved by a device for reducing the alcohol content of wines and other alcoholic beverages according to the appended claim 1, while other technical detailed features of the device are given in the other dependent claims.

Advantageously, the device according to the invention, due to its functional features, is able to partially reduce the alcohol content of wine and other alcoholic beverages in an amount from a minimum of 250 cl. up to a maximum of 10 liters in very small times (about 5 minutes for each 250 cl. of wine).

The small size and the automatic operation make the device particularly suitable for domestic use and for use in conventional catering.

Further objects and advantages of the present invention will become more clear from the following description, relating to a preferred embodiment of the device for partially reducing the alcohol content of wines and other alcoholic beverages, according to the present invention, and from the enclosed drawings, in which.

Firstly, it is clear that, although the description and figures that follow refer to a particular use of the de-alcoholization device, according to the present invention, which is configured to reduce the alcohol content of small quantities of wine, said device can be similarly used for partially reducing the alcohol content of liquor and other alcoholic beverages.

Figure 1:
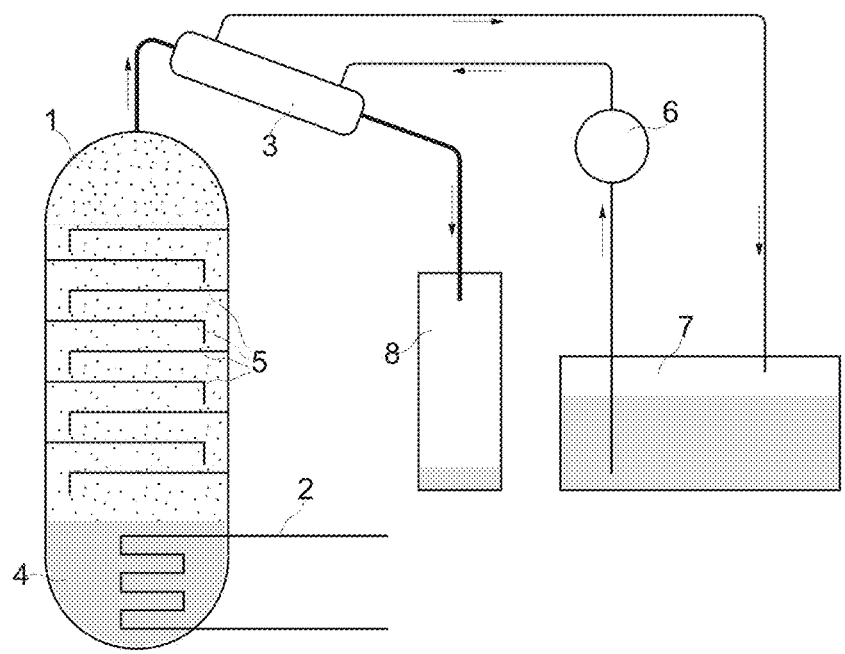
FIG. 1 is a schematic view of a column distillation device for industrial use, according to the prior art.
Figure 2:
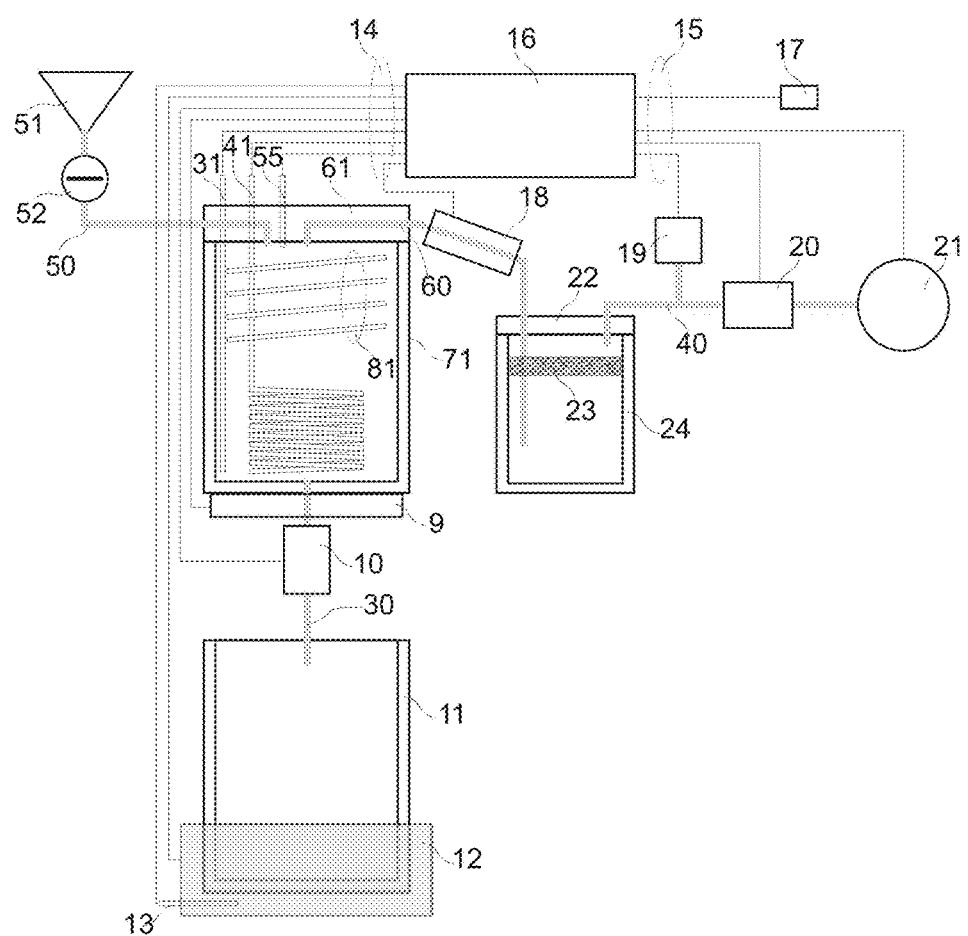
FIG. 2 is a schematic view of a device for reducing the alcohol content of wines and other alcoholic beverages, according to the present invention.
Figure 3:
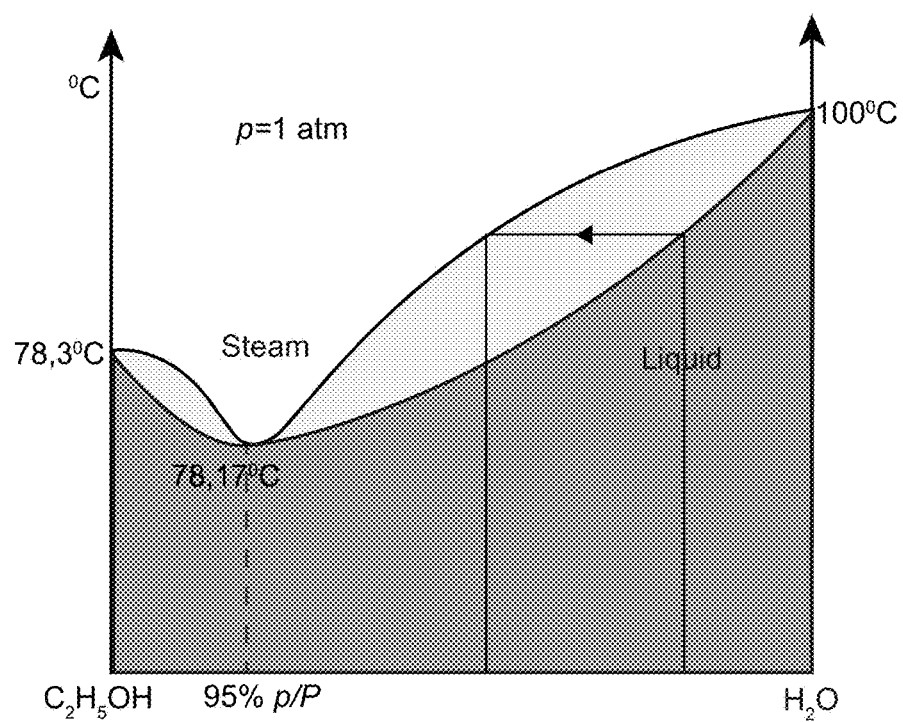
FIG. 3 is an isobaric diagram of a water-alcohol solution.

With particular reference to the enclosed FIGS. 2 and 3, the device according to the invention is housed in a protective anti-shock plastic container, resistant to ultraviolet rays and high temperatures, which can be washed and disinfected and which can be made with materials suitable for using in contact with food.

Said device comprises a distillation column 71, closed at the top by a removable cap 61, which gives the column 71 an hermetic seal.

A feeding pipe 50 connects the feed hopper 51 to the tap 52 and is connected inside the distillation column 71 through the cap 61 to enter the liquid to be treated in the column.

The cap 61 is connected with a first temperature sensor 31, able to measure the temperature of the liquid, a heating resistor 41, which heats the liquid, a second temperature sensor 55, able to measure the temperature of the steam, a series of distillation plates 81, which allow the separation of the vapor from the liquid, and a vapors outlet tube 60, which passes through the cap 61 and is connected to the condenser 18; furthermore, the vapors outlet pipe 60, after passing through the condenser 18, reaches the collection container 24, through the removable cap 22, which gives the container 24 an hermetic seal, which is achieved through the vacuum setting solenoid valve 20, the vacuum pump 21 and the vacuum sensor 19.

The paper filter 23, placed in the collecting container 24, prevents drops of condensate to reach the pipe 40 connecting the solenoid valve 20, the vacuum pump 21 and the vacuum sensor 19.

The distillation column 71 has a magnetic stirrer 9, which allows for a uniform distribution of the temperature and the separation of lighter substances from the heavier substances of the liquid to be treated, and a pipe drain 30 is connected at the base of the distillation column 71 for emptying the column 71, through a solenoid valve 10, which provides for opening the passage of the liquid towards the cooling container 11 which is in turn cooled by the chiller 12.

A temperature sensor 13 is used for reading the temperature of the cooled liquid in the container 11.

The entire operation of the device is managed by an electronic control circuit 16, which, through the electrical wiring 14, 15, detects the measurements provided by the temperature sensors or probes 13, 31, 55 and by the pressure or vacuum sensor 19 and adjusts therefore a plurality of actuators.

The electronic circuit 16 has electronic buttons to start and stop the de-alcoholization process, a multi-function display for displaying the values of temperature and pressure in the different sections of the distillation column 71 and inside the collection container 24, as well as for displaying the state of operation of the device (regular, presence of anomalies, failures, errors, etc.); the device has also a keyboard for inputting operating parameters, such as, for example, the amount of the liquid to be treated, the percentage of de-alcoholization, the final temperature of the treated product, etc.

The power supply is applied to the socket 17, which has a protection circuit against short-circuits and over-voltage and which has a grounding point.

The operation of the device for reducing the alcohol content of wines and other alcoholic beverages, according to the present invention, is substantially the following.

The wine or other liquid to be treated is poured into the feed hopper 51 and, through the opened tap 52, enters the distillation column 71.

The quantity of wine is set in the control circuit 16 and the type of wine introduced (white, pink, red, dry, sparkling, etc.) can be also selected, as well as the desired percentage of de-alcoholization and the final temperature of the wine.

Before starting the process of de-alcoholization it is necessary to check the proper closure of the tap 52, of the cap 61 and of the cap 22, then pressing a trigger button on the control circuit 16 starts the operation of the device.

In practice, the solenoid valve 10 remains in a closed position by default, while the proportional vacuum setting solenoid valve 20 is opened and the heating resistor 41, the magnetic stirrer 9, the vacuum pump 21, the condenser 18 and the chiller 12 are supplied, so that, in particular, the condenser 18 and the chiller 12 reach their respective operating temperatures.

The electronic control circuit 16 regulates the power applied to the heating resistor 41 and the opening of the proportional solenoid valve 20 as a function of the temperature value read by the sensor 31, as a function of the pressure value read by the vacuum sensor 19, as a function of the final temperature value of the wine and as a function of the vacuum value to be reached inside the collecting container 24.

The evaporation condition of the ethyl alcohol and of other volatile compounds is determined by means of the electronic control circuit 16, by relating the value of the temperature detected on the head of the column 71 through the temperature sensor 55 with the value of vacuum inside the column 71 read through the vacuum sensor 19; this condition is maintained for the time necessary to extract the percentage of ethyl alcohol which has been set, thus varying the liquid temperature and the pressure within the column 71.

The vapors escaping from the outlet tube 60 located on the head of the column 71 return to the liquid phase through the condenser 18 and then reach the collection container 24.

The end of the process is managed by the electronic control circuit 16, by relating the value of the temperature detected on the head of the column 71 through the temperature sensor 55 with the value of vacuum within the column 71 which is read through the vacuum sensor 19.

When the process is finished, the vacuum pump 21 is turned off, together with the heating resistor 41 and with the magnetic stirrer 9, while the setting solenoid valve 20 and the solenoid valve 10 are opened, so as to send the treated wine into the cooling container 11; the final temperature of the de-alcoholic wine is controlled by the electronic control circuit 16 by adjusting the power supplied to the chiller 12, according to the value of temperature read by the sensor or probe 13.

In particular, the extraction phase of the ethyl alcohol is controlled by the electronic control circuit 16 by means of an automatic control procedure, which analyzes the values of pressure and temperature inside the column 71 and controls the heating resistor 41 and the setting solenoid valve 20 according to a determined algebraic relationship.

The adjustment takes place according to the isobaric diagram of water-alcohol solutions (see the enclosed FIG. 3) and the extraction temperature of the liquid can be set in the electronic circuit 16 in a range varying from 0° C. to 100° C.; to avoid alterations of the organoleptic and aromatic characteristics of the wine, it is preferred to set said value of the extraction temperature to 35° C., being however possible to choose a different value comprised in the above mentioned range.

Thus, the solution is initially brought to a temperature of about 35° C. at ambient pressure and the solution is heated by the heating resistor 41, while the temperature of the solution is read by the temperature sensor or probe 31.

The proportional control of the thermal power of the heating element 41 and the function of the magnetic stirrer 9 allow an uniform temperature distribution within the solution.

Upon reaching the temperature of 35° C., measured by the temperature sensor or probe 55, the pressure inside the column 71 is made to decrease progressively until it reaches the value expected from the isobaric diagram of water-alcohol solutions, and the equilibrium condition between the value of the steam temperature and the value of pressure, according to the isobaric diagram, is ensured by the continuous adjustment, provided by the electronic control circuit 16, of the thermal power of the heating resistor 41 and of the vacuum generated by the vacuum pump 21 and controlled by the solenoid valve 20.

The vapors are mainly composed of ethyl alcohol and, being lighter, escape from the extraction pipe 60 of the head of the column 71, contact the condenser 18 and return (cooled) to the liquid phase, thus flowing into the collection container 24.

When the percentage of ethyl alcohol in the solution decreases, with a constant pressure, the temperature increases and is near to the boiling water temperature and therefore the control circuit 16 reacts further decreasing the pressure inside the column 71, so as to allow the extraction of alcohol without increasing the temperature of the solution.

The process ends when the percentage value of the extracted alcohol reaches the percentage value which has been set in the electronic control circuit 16.

The features of the device for reducing the alcohol content of wines and other alcoholic beverages, which is the object of the present invention, are clear from the above description, as well as the relating operational and functional advantages are also clear, such as:

direct and quick consumption of de-alcoholized wine,
possibility to treat wine and alcoholic beverages even in small quantities (i.e. 250 cl.),
possibility to treat any quality of wine or any other alcoholic beverage,
operating process under vacuum and at low temperature, so as to avoid alterations of the aromatic qualities and organoleptic characteristics of the wine and/or other alcoholic beverages,
possibility for the user to not exceed dangerous levels of alcohol (for example, in order to be able to drive safely),
possibility of use of the device at home, in bars, restaurants, etc., given the reduced overall dimensions,
whole transportability of the device, which moreover does not require a fixed installation,
fully automatic process, quick and easy for the user,
simple and cheap maintenance,
easy to use, thus requiring no technical knowledge.

It is finally clear that many other variations may be made to the device of the present invention, without departing from the principles of novelty inherent in the inventive idea as claimed in the appended claims, as it is clear that in the practical implementation of the invention, the materials, shapes and dimensions of the details illustrated may be any according to requirements and they can be replaced with other equivalent.

The invention claimed is:

1. Process for reducing the alcohol content of wine to form wine having a reduced alcohol content, comprising the following steps:

inserting wine into a distillation column (71), which contains distillation trays (81) for separating vapor from said wine, where said distillation column (71) has a first temperature sensor (31) for measuring wine temperature, a heating resistor (41) for heating the wine to form vapor and a second temperature sensor (55) for measuring temperature of said vapor inside said distillation column (71), heating said wine in said distillation column (71) which contains distillation trays (81) for separating vapor from said wine to form vapor, forwarding said vapor to a vapor discharge pipe (60), which is connected to a condenser (18) and to a vacuum collecting container (24), that is connected to a setting valve (20), that is connected to a vacuum pump (21) and to a pressure sensor (19), forwarding wine having a reduced alcohol content from a bottom of said distillation column (71) connected to a wine discharge pipe (30), by a discharge valve (10) connected to a cooling container (11), said cooling container (11) being placed below said distillation column (71) where said cooling container (11) is cooled by a chiller (12), said process for reducing the alcohol content of wines being controlled by an electronic control circuit (16) that detects measurements made by said first temperature sensor (31) and said second temperature sensor (55) and by said pressure sensor (19) and, on the basis thereof, adjusts power to said heating resistor (41) and to an opening of said setting valve (20) as a function of a temperature value of the wine read by said first temperature sensor (31), as a function of a pressure value of the wine read by said pressure sensor (19), as a function of a final temperature value of the wine and as a function of a vacuum value inside said vacuum collecting container (24), said power to said heating resistor (41) and to said opening of said setting valve (20) being continuously adjusted according to an isobaric diagram of water-alcohol solutions corresponding to an extraction temperature, so that the wine is initially brought to said extraction temperature at ambient pressure and the wine is heated by said heating resistor (41), while a temperature of the wine is read by said first temperature sensor (31), and, upon reaching said extraction temperature, measured by said first temperature sensor (31), pressure inside said distillation column (71) is gradually decreased until said pressure inside said distillation column (71) reaches a value expected from said isobaric diagram of water-alcohol solutions to form an equilibrium condition between said vapors temperature and a pressure value according to said isobaric diagram of water-alcohol solutions.

2. Process as claimed in claim 1, characterized in that, when a desired percentage of a reduced alcohol content is reached, said electronic control circuit (16) switches off said vacuum pump (21) and said heating resistor (41) and opens said setting valve (10) and said discharge valve (20), so as to collect the wine having a reduced alcohol content in said cooling container (11).

3. Device for reducing the alcohol content of wines and implementing a process according to claim 2 comprising:

a distillation column (71), which contains distillation trays (81) for separating vapor from the wine, a first temperature sensor (31) in said distillation column (71) for measuring the wine temperature, a heating resistor (41) in said distillation column (71) for heating the wine, a second temperature sensor (55) for measuring the vapors temperature inside the distillation column (71), means for separating vapor from the wine comprising said distillation trays (81) which allow the separation of vapor from a liquid and a vapors discharge pipe (60), which is connected to a condenser (18) and to a vacuum collecting container (24), connected to a setting valve (20) and to a vacuum pump (21) and to a pressure sensor (19), a discharge valve (10) for forwarding the wine having a reduced alcohol content from the bottom of said distillation column (71) to a wine discharge pipe (30), a cooling container (11), placed below said column (71) and cooled by a chiller (12), an electronic control circuit (16) for detecting the measurements made by said temperature sensors (31, 55) and by said pressure sensor (19) and, on the basis thereof, for adjusting the power of said heating resistor (41) and the opening of said setting valve (20).

4. Device for reducing the alcohol content of wines and implementing a process according to claim 1 comprising:

a distillation column (71), which contains distillation trays (81) for separating vapor from the wine, a first temperature sensor (31) is said distillation column for measuring the wine temperature, a heating resistor (41) for heating the wine, a second temperature sensor (55) for measuring the vapors temperature inside the column (71), means for separating vapor from the wine comprise said distillation trays (81), in said distillation column (71), wherein said distillation trays (81) separate vapors from the wine, a vapor discharge pipe (60), which connects said distillation column (71) to a condenser (18) and to a vacuum collecting container (24), connected to a setting valve (20) and to a vacuum pump (21) and to a pressure sensor (19), a discharge valve (10) for forwarding the wine having a reduced alcohol content from the bottom of said distillation column (71) to a wine discharge pipe (30), a cooling container (11), placed below said column (71) and cooled by a chiller (12), an electronic control circuit (16) for detecting the measurements made by said temperature sensors (31, 55) and by said pressure sensor (19) and, on the basis of said measurements, adjusting the power of said heating resistor (41) and the opening of said setting valve (20).

5. Device as claimed in claim 4, characterized in that said vacuum collecting container (24) has a filtering element (23), for preventing condensed droplets from contacting a pipe (40) connecting said vacuum collecting container (24) with said setting valve (20), said vacuum pump (21) and said pressure sensor (19).

6. Device as claimed in claim 5, characterized in that a magnetic stirrer (9) is placed at the bottom of said distillation column (71) for obtaining a uniform distribution of temperature in the wine that is treated in said distillation column (71).

7. Device as claimed in claim 5, characterized in that said electronic control circuit (16) has electronic buttons to start and stop said device, a multi-function display for displaying the values of temperature provided by said first temperature sensor (31) and said second temperature sensor (55) and of pressure in said distillation column (71) and within said vacuum collecting container (24) and for displaying the operation status of the device, and a keyboard for entering operating parameters, including the amount of liquid to be treated, the percentage of alcohol content reduction, the final temperature of the liquid and the type of the liquid.

8. Device as claimed in claim 4, characterized in that a magnetic stirrer (9) is placed at the bottom of said distillation column (71) for obtaining a uniform distribution of temperature in the liquid to be treated.

9. Device as claimed in claim 8, characterized in that said electronic control circuit (16) has electronic buttons to start and stop said device, a multi-function display for displaying the values of temperature in different points of said distillation column (71) and within said vacuum collecting container (24) and of pressure in said distillation column (71) and within said container (24) and for displaying the operation status of the device, and a keyboard for entering operating parameters, including the amount of liquid to be treated, the percentage of alcohol content reduction, the final temperature of the liquid and the type of the liquid.

10. Device as claimed in claim 4, characterized in that said electronic control circuit (16) has electronic buttons to start and stop said device, a multi-function display for displaying the values of temperature provided by said first temperature sensor (31) and said second temperature sensor (55) and of pressure in said distillation column (71) and within said vacuum collecting container (24) and for displaying the operation status of the device, and a keyboard for entering operating parameters including the amount of liquid to be treated, the percentage of alcohol content reduction, the final temperature of the liquid and the type of the liquid.

* * * * *